(12) United States Patent
Tadakuma et al.

(10) Patent No.: US 6,920,263 B2
(45) Date of Patent: Jul. 19, 2005

(54) OPTICAL PULSE GENERATOR

(75) Inventors: Masateru Tadakuma, Chiba (JP); Osamu Aso, Chiba (JP); Shunichi Matsushita, Chiba (JP); Misao Sakano, Chiba (JP); Shu Namiki, Chiba (JP)

(73) Assignee: The Furukawa Electric Company, Ltd., Chiba (JP)

( * ) Notice: Subject to any disclaimer, the term of this patent is extended or adjusted under 35 U.S.C. 154(b) by 189 days.

(21) Appl. No.: 10/056,925

(22) Filed: Jan. 24, 2002

(65) Prior Publication Data

US 2003/0012492 A1 Jan. 16, 2003

(30) Foreign Application Priority Data

Jan. 30, 2001 (JP) ...................................... 2001-022221
Dec. 18, 2001 (JP) ...................................... 2001-385094

(51) Int. Cl.$^7$ ................................................ G02B 6/26
(52) U.S. Cl. ............................ 385/27; 385/15; 385/122
(58) Field of Search .............................. 385/15, 24, 27, 385/122; 398/182, 200; 372/25, 30

(56) References Cited

FOREIGN PATENT DOCUMENTS

JP 2000-214499 8/2000

OTHER PUBLICATIONS

Chermikov et al. Comblike dispersion–profiled fiber for soliton pulse train generation, Optics Letters vol. 19, No. 8, pp 539–541. Apr. 1994.*
Toda et al. Optical Soliton Transmission in a Comb–Like Dispersion Profiled Fiber Loop, ECOC 97, Conference Publication No. 448, pp 319–322. Sep. 1997.*
Doran et al., Optics Letters, 13(1):56–58, 1988, "Nonlinear–optical loop mirror."
Chernikov et al., Electronics Letters, 29(20):1788–1789, 1993, "Integrated all optical fibre source of multigigahertz soliton pulse train."
Swanson et al., IEEE Photonics Technology Letters, 7(1):114–116, 1995, "40–GHz Pulse Train Generation Using Soliton Compression of a Mach–Zehnder Modulator Output."
Franco et al., J. Opt. Soc. Am. B, 11(6):1090–1097, 1994, "Characterization and optimization criteria for filterless erbium–doped fiber lasers."
Giles et al., IEEE Photonics Technology Letters, 2(11):797–800, 1990, "Spectral Dependence of Gain and Noise in Erbium–Doped Fiber Amplifiers."
Fermann et al., Optics Letters, 15(13):752–754, 1990, "Nonlinear amplifying loop mirror."
Steele, Electronics Letters, 29(22):1971–1972, 1993, "Pulse compression by an optical fibre loop mirror constructed from two different fibres."
"Optical Pulse Compression," Chapter 6, pp. 201–237.
Chernikov et al., Electronics Letters, 30(5):433–434, 1994, "Experimental demonstration of step–like dispersion profiling in optical fibre for soliton pulse generation and compression."

(Continued)

Primary Examiner—John D. Lee
Assistant Examiner—Sarah Song
(74) Attorney, Agent, or Firm—Oblon, Spivak, McClelland, Maier & Neustadt, P.C.

(57) ABSTRACT

An optical pulse generator comprises a comb-like dispersion profiled fiber formed into an optical loop mirror. The fiber may comprise three or more segments of fiber having alternating highly dispersive and highly nonlinear characteristics. The optical loop mirror construction splits an input pulse into two portions that propagate through the CDPF in opposite directions. The pulse portions are re-combined, and a compressed pulse with reduced noise is produced.

35 Claims, 18 Drawing Sheets

OTHER PUBLICATIONS

Shipulin et al., *Electronics Letters*, 29(16):1401–1403, 1993, "High repetition rate CW fundamental soliton generation using multisoliton pulse compression in a varying dispersion fibre."

Chernikov et al., *Electronic Letters*, 28(10):931–932, 1992, "Generation of soliton pulse train in optical fibre using two CW singlemode diode lasers."

H. Toda, et al., IEICE Transactions on Communications, vol. E82–B, no. 9, pp. 1541–1543, XP–000940272, "10 Gbit/S Optical Soliton Transmission Experiment in a Comb–Like Dispersion Profiled Fiber Loop", Sep. 1999.

H. Toda, et al., IEEE Photonics Technology Letters, vol. 9, no. 10, pp. 1415–1417, XP–000721350, "Optical Soliton Transmission Experiment in a Comp–Like Dispersion Profiled Fiber Loop", Oct. 1, 1997.

M. Tadakuma, et al., Optical Fiber Communication Conference, (IEEE Cat. no. 00Ch37079), vol. 3, pp. 178–180, XP–002239776, "A 104Ghz 328FS Soliton Pulse Train Generation Through a Comb–Like Dispersion Profiled Fiber Using Short High Nonlinearity Dispersion Fibers", 2000.

W. S. Wong, et al., Optics Letters, vol. 22, no. 15, pp. 1150–1152, XP–000699111, "Self–Switching of Optical Pulses in Dispersion–Imbalanced Nonlinear Loop Mirrors", Aug. 1, 1997.

R. Yatsu, et al., Optics Letters, vol. 24, no. 16, pp. 1172–1174, XP–000859257, "High–Quality Sub–100–FS Optical Pulse Generation by Fiber–Optic Soliton Compression of Gain–Switched Distributed–Feedback Laser–Diode Pulses in Conjunction With Nonlinear Optical Fiber Loops", Aug. 15, 1999.

K. R. Tamura, et al., IEEE Photonics Technology Letters, vol. 11, no. 2, pp. 230–232, XP–000803434, "Spectral–Smoothing and Pedestal Reduction of Wavelength Tunable Quasi–Adiabatically Compressed Femtosecond Solitons Using a Dispersion–Flattened Dispersion–Imbalanced Loop Mirror", Feb. 1999.

* cited by examiner

OPTICAL PULSE GENERATOR

BACKGROUND OF THE INVENTION

The present invention relates to optical pulse generators.

Long-distance transmission of large amounts of information is currently being achieved by transmitting optical pulses representing digital data over fiber optic transmission lines. These optical signals comprise trains of light pulses having small pulse width densely packed with respect to time. The use of pulses having extremely short duration helps to pack more information along the transmission lines. A variety of techniques are currently being employed to generate such pulses, however, optical pulses produced by many conventional methods are accompanied by noise at the base of the optical pulse. Light components in addition to the optical pulse itself arise as a result of dispersion, non-uniformity of the effective fiber core area, loss, the influence of high-order dispersion and other effects in the optical fiber communication system. Such unwanted light components resemble a pedestal of noise on which the optical pulse appears to sit. This noise component can cause inter-symbol interference and thereby increase the bit error rate of an optical communication system.

With the demand for transmission of more and more amounts of data, shorter and shorter duration optical pulses are desired. What is needed, therefore, are techniques and components for reducing the duration of optical pulses while minimizing or removing the aforementioned noise components accompanying the pulse.

SUMMARY OF THE INVENTION

Optical pulses are narrowed in width and while suppressing noise. In one embodiment, an optical pulse shaper comprises a comb-like dispersion profiled fiber (CDPF) having end portions coupled so as to form an optical loop mirror.

In another embodiment, a device for producing optical pulses comprises a four-way optical coupler having four ports, an input port, two side ports and an output port, the coupler defining an optical path from the input port to the two side ports and from each of the two side ports to the output port such that light received by the optical coupler through the input port is coupled to each of the side ports and light entering either of the side ports may be directed through both the input port and the output port. The device also comprises an optical path optically connecting the side ports such that light entering the input port and coupled to one of the side ports propagates through the optical path back into the other side port, the optic path comprising separate portions having different lengths and alternating in dispersive and nonlinear characteristics. In this embodiment, the lengths, dispersive and nonlinear characteristics are selected in accordance with characteristics of an input pulse such that input optical pulses propagating through the optical path are compressed in width and are phase shifted with respect to each other an amount to cause the pulses to interfere when combined in the optical coupler to separate out lower intensity noise components from peak signal components associated with the pulses.

Methods of pulse compression are also provided. In one embodiment, a method of compressing an optical pulse to provide a reduced pulse width and to suppress noise comprises splitting the optical pulse into first and second portions of lesser magnitude; propagating the first portion in a first direction through a medium comprising at least four sections creating a comb-like dispersion profile, the sections alternating in dispersion level, the first portion undergoing pulse compression and phase shift with the propagation through the medium and propagating the second portion in a second direction opposite to the first direction through the medium comprising at least four sections creating a comb-like dispersion profile, the second portion also undergoing pulse compression and phase shift with the propagation through the medium. The method further includes combining and optically interfering the phase shifted pulse portions so as to suppress the noise.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
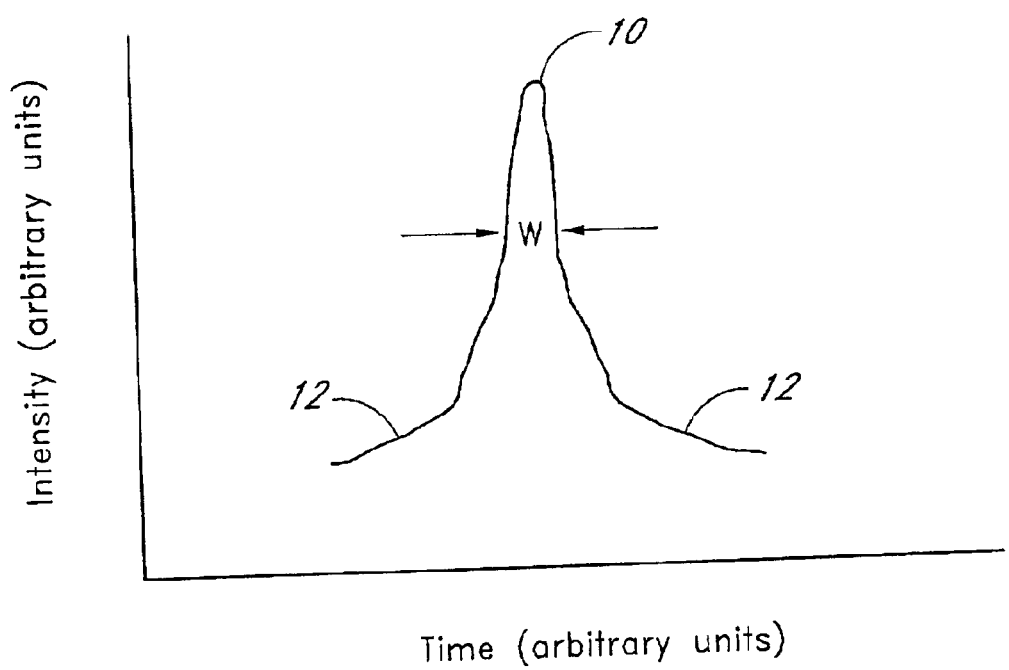
FIG. 1 is a schematic drawing of an optical pulse comprising a central peak rising above an elevated level of background noise.
Figure 2:
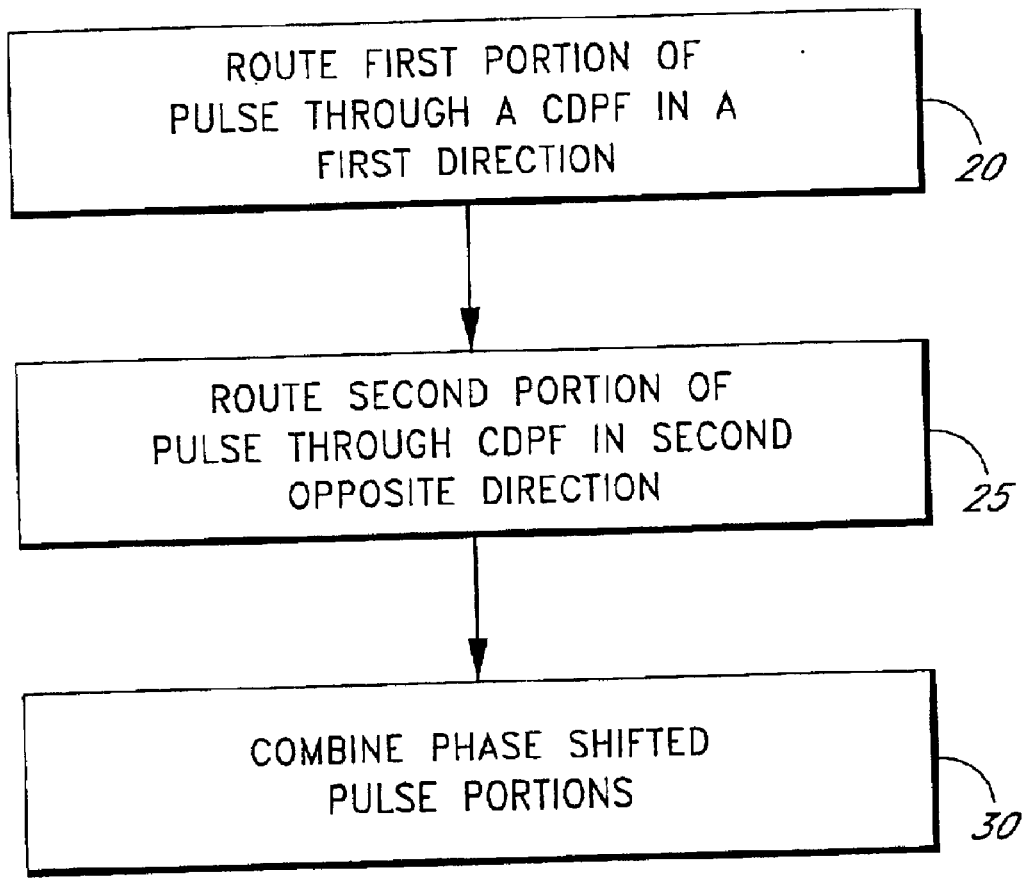
FIG. 2 is a block diagram outlining a generally methodology for providing optical pulses.

As described above and depicted in FIG. 1, optical pulses derived from conventional pulse compression devices propagating through fiber optic communication systems may comprise a central peak 10 having a pulse width, w, that is accompanied by noise components 12 extending beyond the width of the central peak. Because this noise has lower amplitude and is wider in temporal extent than the peaked component 10 of the optical pulse, the noise component 12 is often characterized as a "pedestal" from which signal pulse peak rises. Preferably, a method such as outlined in block diagram form in FIG. 2, can be employed to provide cleaner optical pulses substantially devoid of this noise pedestal 12 or at least to significantly reduce this noise component. The method comprises (1) compressing the optical pulse and (2) substantially reducing the noise component 12. Preferably, both of these functions are performed by a single device. By compressing the optical pulse it is meant that the temporal duration of the pulse is reduced; it is made shorter in time, i.e., the peak 10 is made more narrow. Starting pulse widths corresponding to full width at half maximum (FWHM) of about 2–3 picoseconds, for example, be compressed to less than 1 picosecond. Some systems may provide output pulses under 500 femtoseconds wide. Pulse widths outside these ranges are also considered possible. Preferably, this noise is decreased by about 5 dB or more. Performance levels outside these ranges are also considered possible.

To compress the optical pulse and substantially reduce the noise, the optical energy from the pulse is split into first and second portions. As illustrated by block 20, the first portion is propagated in a first direction through a comb-like dispersion profiled fiber (CDPF) described more fully below. The second portion (see block 25) is propagated in the opposite direction through the comb-like dispersion profiled fiber. Accordingly, two counter-propagating pulses are sent through the comb-like profile fiber which provides pulse compression. During propagation through the CDPF, the non-linear optical properties of the CDPF induce phase shifts in the pulses. Dispersive properties of the CDPF reduce the temporal width of the pulse. Due to the non-symmetric structure of the CDPF in the two different directions, the amount of phase shift induced in the optical pulses is different for the two oppositely directed pulse portions. At block 30 of FIG. 2, the phase shifted pulse portions are recombined, producing an output pulse in which the lower intensity noise is suppressed.

Figure 3:
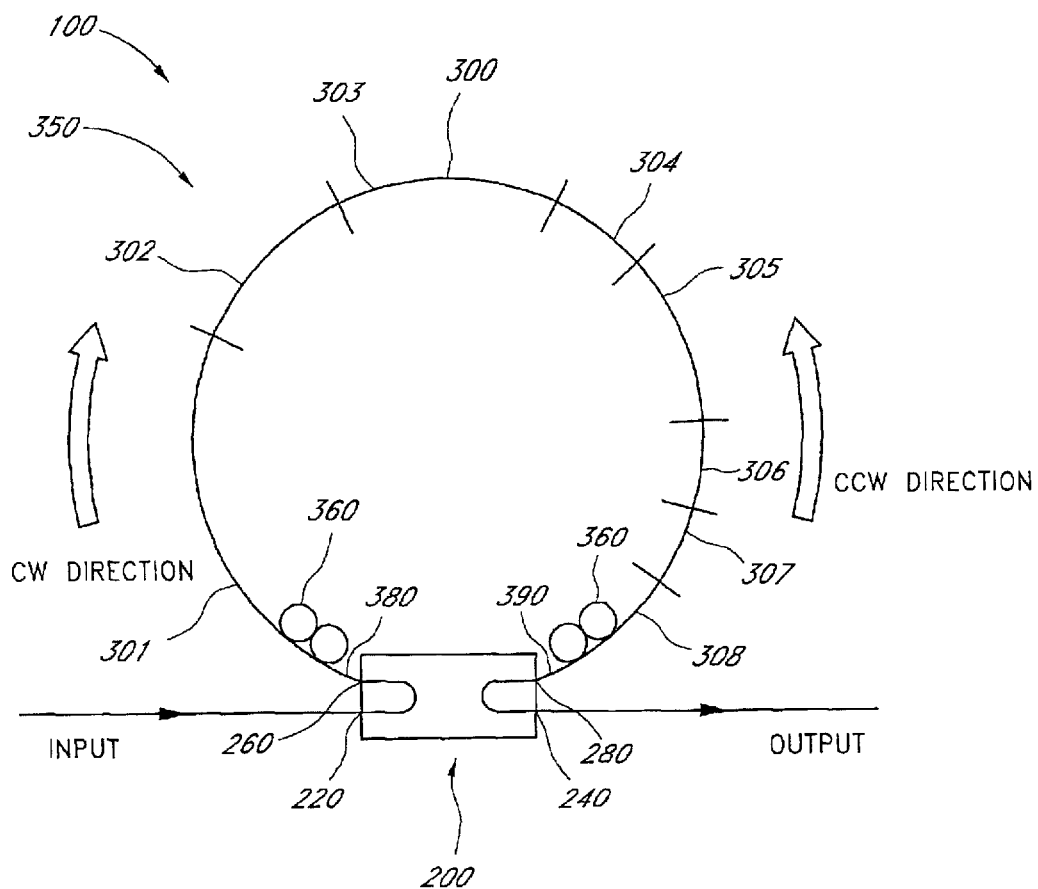
FIG. 3 is a schematic drawing showing one embodiment of an optical pulse generator comprising an optical coupler having four ports, two of which are optically coupled to a fiber optic loop.
Figure 4:
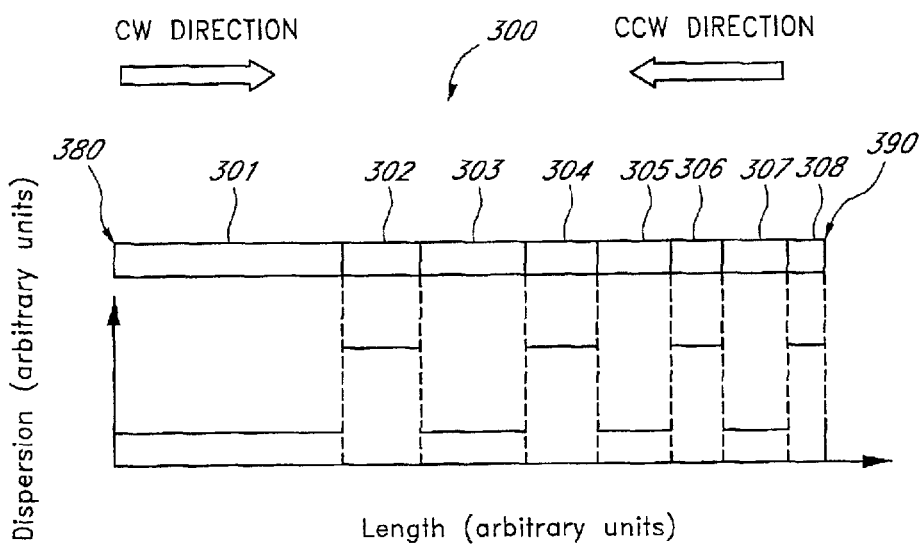
FIG. 4 is a schematic diagram depicting the fiber optic loop as comprising alternating segments of fiber exhibiting higher optical non-linearities and segments exhibiting higher dispersion; a plot on axis of length in arbitrary units and dispersion in arbitrary units) also depicts the dispersion profile through the length of fiber.

A diagram of a device for providing both pulse compression and for removing this noise component 12 is presented in FIGS. 3 and 4, wherein FIG. 4 illustrates the fiber loop of FIG. 3 as a straight line for clarity of illustration. Pulse compression is achieved by providing a propagation path through an optical medium having alternating non-linear and dispersive properties. Thus, a first segment of the path may be through a medium having an index of refraction with relatively high non-linearity, that is, whose value varies with intensity of the optical signal propagating therethrough. This non-linear optical medium is followed by a relatively dispersive optical medium whose index of refraction varies with wavelength. Preferably, the non-linear optical medium has substantially higher non-linearity than the dispersive medium while the dispersive optical medium is substantially more dispersive than the nonlinear optical medium. Together the non-linear optical medium and the dispersive propagation paths make up a module for compressing the pulse. A series of such modules can be concatenated to provide enhanced pulse compression. The amount of nonlinearity and dispersion in each segment may be less or the duration that the pulse is exposed to such nonlinear and dispersive regions may be different along different portions of the path. The nonlinear and dispersive optical mediums preferably comprise optical fibers but may comprise any material or structures having substantial non-linearities or dispersive properties such as for example discrete optical components (e.g. optical crystals) as well as waveguides. Photonic crystals such as chalcogenide fibers may, for example, be suitably employed.

The optical device depicted in FIG. 3 includes a plurality of pulse compression modules having ends optically coupled so as to form a fiber optic mirror configuration that simultaneously provides enhanced pulse compression and to substantially remove the noise pedestal 12 at the base of the pulse peak 10. This optical device 100, herein also referred to as an optical pulse generator, includes a 2×2 optical coupler 200 having four ports 220, 240, 260, 280. This coupler 200 preferably comprises a fiber optic coupler but may comprise other waveguide couplers such as planar or buried waveguide devices or other types of waveguide structures. Still other forms of coupling devices having the appropriate performance characteristics may also be employed.

A general description of an optical loop mirror is provided, e.g., by N. J. Doran et al in *Non-linear optical loop*

*mirror*, Optical Letters, Vol. 13, No. 1, January 1988, pp. 56–58, which is hereby incorporated by reference in its entirety. In the optical loop mirror described therein, two optical ports of an "X" fiber coupler are joined. In this manner, a single input is split into two counter-propagating fields, which return in coincidence to recombine at the coupler.

In the design depicted in FIG. 3, the optical coupler 200 has two input/output ports 220, 240, and two fiber loop ports 260, 280 based on their use and/or the optical connections made therewith. The first input/output port 220, hereinafter referred to as the "input port", is optically coupled to a source of optical pulse. The optical coupler 200 is configured such that an optical signal input into this first input/output port 220 will be split between the two fiber loop ports 260, 280. The light is divided between the two fiber loop ports 260, 280 according the branching ratio $\alpha:1-\alpha$. A second input/output port 240, hereinafter referred to as "output port", typically corresponds to the output of the optical pulse generator. The optical coupler 200 is configured such that light propagating into the first loop port 260 (or the second loop port 280) is split and exits the optical connector 200 through the input and output ports 220, 240.

The optical pulse generator 100 further comprises a length of optical fiber 300 having two ends 380, 390 optically connected to the first and second loop ports 260, 280, respectively. The result is an optical path between the first and second loop ports 260, 280, herein referred to as a fiber optic loop 350.

The amount of light entering these two ports 260, 280 is divided according to the branching ratio of $\alpha:1-\alpha$. One of the two pulse portions enters the optical fiber loop 300 through the first loop port 260 and propagates through the optical fiber loop in the clockwise (CW) direction. The other pulse portion enters the optical fiber loop 300 through the second loop port 280 and propagates in the counter-clockwise (CCW) direction. The two signals are combined again in the optical coupler 200 after propagating through the length of the optical fiber loop 350. To equalize the polarized states of the two signals, polarization controllers 360 may be provided in the optical fiber loop 350.

The length of fiber 300 forming the optical fiber loop 350 comprises a plurality of sections or segments 301, 302, 303, 304, 305, 306, 307, 308. Some of the segments 301, 303, 305, 307 comprise a nonlinear optical medium having an optical index of refraction whose value varies with the intensity of light propagating therein. This medium, for example, may have a nonlinear optical coefficient that ranges from about 5 to 10 $W^{-1}$ $km^{-1}$ or more preferably between about 10 to 15 $W^{-1}$ $km^{-1}$. Values outside these ranges are also considered possible such as 2.5 $W^{-1}$ $km^{-1}$ typical of standard optical fiber. Other segments 302, 304, 306, 308 comprise a dispersive medium, having an index of refraction that varies with wavelength. In one embodiment, for example, the nonlinear sections comprises 1550 nanometer (nm) band zero-dispersion shifted fibers segments (DSFs), and the dispersive sections comprise 1300 nm band zero-dispersion fibers, i.e., signal mode fiber (SMFs). The DSFs and SMFs differ from each other in dispersion, as shown by the plot in FIG. 4, which depicts a comb-like dispersion profile comprising alternating high and low dispersion regions. Such a configuration may be employed to compress a pulse having a wavelength of about 1550 nm.

In the optical fiber loop 350, the two types of optical fibers differing in nonlinear optical coefficient and in dispersion characteristic are alternated. A total of eight fiber segments 301, 302, 303, 304, 305, 306, 307, 308 comprising the optical fiber transmission path 300 are shown in FIGS. 3 and 4, however, any number of such sections can be employed. Preferably, three or more; more preferably, more than 6 such sections are included in the length of fiber 300. Also, the eight segments 301, 302, 303, 304, 305, 306, 307, 308 are attached to each other to form a continuous path of alternating media, other configurations are possible. For example, one or more of the segments or connections therebetween can be interrupted with other components or even separated by free-space regions. Preferably, however, the fiber optic line 300 forms a continuous propagation path with minimal loss for an optical signal propagating therethrough.

As shown, the fiber segments 301, 302, 303, 304, 305, 306, 307, 308 may each have a different length. Moreover, the length advantageously tends to get smaller from one end of the loop to the other. The lengths of both types of fiber segments 301, 302, 303, 304, 305, 306, 307, 308, the nonlinear fiber and the dispersive fiber segments, may be continuously and monotonically reduced such that each succeeding fiber in the cw direction (or ccw direction) is shorter than the preceding fiber. The design of the fiber line 300 is not limited to such continuous and monotonic variations. Preferably, segments are arranged to be non-symmetric with respect to different directions of propagation, i.e., the fiber line 300 acts differently upon forward and backwards propagating light beams.

In one preferred embodiment, the nonlinearity per unit length, i.e., the value of the nonlinearity coefficient is substantially constant throughout the plurality of nonlinear segments 301, 303, 305, 307. Similarly, the dispersion per unit length imposed on a light beam propagating therethrough is constant through the plurality of dispersive segments 302, 304, 306, 308.

The above described alternating arrangement of fiber has been termed a "comb-like dispersion profiled fiber" (CDPF) and an embodiment of a CDPF comprising alternating segments of dispersion shift (DSF) and standard telecommunication fibers (STF) spliced together to provied pulse compression is described in S. V. Chernikov et al, *Integrated all optical fibre source of multigigahertz soliton pulse train*, Electronics Letters, Vol. 29, No. 20, Sep. 30, 1993, pp. 1788–1789, which is hereby incorporated herein by reference in its entirety. See also Eric A. Swanson et al, *40-GHz Pulse Train Generation Using Soliton Compression of a Mach-Zehnder Modulator Output*, IEEE Photonics Technology Letters, Vol. 7, No. 1, January 1995, pp. 114–116, which is also hereby incorporated herein by reference in its entirety.

To operate the optical pulse generator 100, an optical signal comprising an optical pulse is supplied to the input port 220 of the optical coupler 200. This optical signal is split by the optical coupler 200 into two beams each containing a portion of the optical pulse energy, one for each of the two fiber loop ports 260, 280.

Without being limited to any particular theory, operation of the CDPF loop mirror of FIG. 3 may be qualitatively described as follows. For this discussion, it is assumed that two beams of laser light having different wavelengths are beat together to produce a pulsed signal. The two wavelength beams are input into the optical coupler 200 through the input loop port 220. A portion of the two wavelength beams are coupled into the fiber line 300 via the first fiber loop port 260 and propagates in the CW direction through the loop 350. As a result of the four-wave mixing process, sideband components in the spectrum are produced. These sidebands result in chirping of the signal. As the chirped pulse propagates through the second segment 302, its dispersive character acts on the pulse to transform the chirped signal into a compressed signal. Dispersion in this segment causes certain frequency or wavelength components to propagate at a slower velocity than others. Preferably, the chirps in the rising and falling portions of each pulse are compensated for by an anomalous dispersion effect on the above-described optical pulses, thereby reducing the pulse width. For example, the fiber line is preferably configured such that the frequency components at the leading edge are slowed with respect to the remainder of the pulse. Ideally, this delay is less than the temporal width of the pulse such that the leading edge is delayed so as to overlap in time the remainder of the pulse. The outcome is a pulse with a shorter resultant pulse width and an increased peak value.

In the third fiber segment 303, the light pulse experiences self-phase modulation as a result of the non-linearity of the refractive index of that structure. Self-phase modulation is a consequence of the strong dependency of the nonlinear optical index of refraction on the intensity of light. Peaks in intensity cause the refractive index to change thereby producing phase shifts in the optical signal. The intensity variation corresponding to the pulse of light is transformed into phase and ultimately a frequency that shifts over the duration of the optical pulse and as a consequence, the frequency spectrum of the pulse is widened.

The chirped signal enters the fourth segment 304 of the fiber loop 350 which comprises optical fiber having a pronounced dispersive effect. In the fourth-stage fiber segment 304, the chirps experience temporal shifting due to the dispersion. Preferably, the leading edge components are delayed with respect to the central portion of the pulse such that the leading edge overlaps the central peak 10. Similarly, the trailing edge of the pulse is preferably accelerated with respect to the central peak such that the trailing edge overlaps the central portion of the pulse. The pulse width is thereby further reduced while its peak is heightened.

The process of chirping the pulse and temporally delaying the portions of the pulse to reduce its duration are repeated twice more in the remaining four segments 305, 306, 307, 308. In this manner, the width of the optical pulse is made progressively shorter and the peak progressively higher. As discussed above, the number of segments is not limited to eight and the number of times the pulse is compressed is not limited to four. More or less segments may be employed to compress the pulse in stepwise fashion.

An optical pulse propagating through the fiber optic loop 350 in the CCW direction undergoes the same nonlinear and dispersion effects as those described above in the process of passing through the fiber segments. However, since the structure of the fiber loop 350 is asymmetric as seen by the two propagating pulses, the optical pulse propagating through the fiber in opposite directions experience different changes and the rates of compression of the two optical pulses finally output are different. For example, the counter-clockwise propagating wave may have undergone a small amount of compression and a small increase in peak intensity when it enters the fifth segment 305. In contrast, the clockwise propagating wave will be much narrower and have a higher peak value when it reaches the fifth segment 305. Thus, clockwise and counter-clockwise propagating pulses will be phase shifted with respect to each other after they have propagated through the loop 350 when they return to the optical coupler 200 as a result of the nonlinear effect that they undergo during propagation through the loop.

Generally, nonlinear phase shifts caused in light propagating through a fiber optic loop 350, e.g. formed of eight fiber segments 301, 302, 303, 304, 305, 306, 307, 308 as shown are expressed by the following equations:

$$\phi_{cw} = \sum_{i=1}^{8} \gamma_i I_{cw_i} L_i \quad (1)$$

$$\phi_{ccw} = \sum_{i=1}^{8} \gamma_i I_{ccw_i} L_i \quad (2)$$

where $\gamma_i$ is the nonlinear optical coefficient of the $i^{th}$ fiber segment, $I_i$ is the intensity of light input to the $i^{th}$ fiber segment, and $L_i$ is the length of the $i^{th}$ fiber segment. The coefficient $\gamma_i$ is equal to $2\pi n_2/A_{eff}\lambda$, where $n_2$ is the nonlinear refractive index, $A_{eff}$ is the effective fiber core area, and $\lambda$ corresponds to wavelength.

From comparison between equations (1) and (2), it can be understood that since the intensities of light ($I_{cwi}$, $I_{ccwi}$) of the two pulse components as they propagate through each fiber segment 301, 302, 303, 304, 305, 306, 307, 308 are different from each other, the total phase shifts ($\phi_{cw}$, $\phi_{ccw}$) caused in the two pulse components in the optical fiber 300 are also different from each other.

P. Franco, M. Midrio, A. Tozzato, M. Romagnol and F. Fontana, "Characterization and optimization criteria for filterless erbium-doped fiber lasers", *J. Opt. Soc. Am. B* 11, No. 6, 1090 (1994) and C. R. Giles and Di. Giovanni, "Spectral Dependence of Gain and Noise in Erbium-doped Fiber Amplifier", *IEEE Photon. Tech. Lett.*, 2, No. 11, 797 (1990), among other references, provide the mode coupling equations for expressing transfer of energy between the modes of two waveguides positioned in close proximity to each other. According to this relationship, the electric field coupled from one waveguide to the other waveguide has a phase shift value of $\lambda/2$ relative to the initial electric field.

Thus, for the two pulse components upon returning to the optical coupler 200 at the first and second loop port 260, 280 the relationship between the input electric field at the input port 220 and electric field at the loop ports 260, 280 is shown the following relationships:

$$E_{LP1} = \alpha^{1/2} \cdot E_{in} \quad (3)$$

$$E_{LP2} = i(1-\alpha)^{1/2} \cdot E_{in} \quad (4)$$

where $E_{LP1}$ is the electric field of the pulse at the first loop port 260 having propagated around the fiber loop 350 in the CCW direction and $E_{LP2}$ is the electric field of the pulse at the loop port 280 having propagated around the loop in the CW direction; $E_{in}$ is the electric field of the optical pulse input to the pulse generator 100 at the input port 220, $\alpha$ is the branching ratio of the optical coupler and $i=\sqrt{-1}$.

Since each pulse component has been phase-shifted as a result of propagation around the optical fiber loop 350, $E_{LP1}$ and $E_{LP2}$ are expressed by the following equations:

$$E_{L1} = \alpha^{1/2} \cdot E_{in} \exp^{i\phi_{cw}} \quad (5)$$

$$E_{L2} = i(1-\alpha)^{1/2} \cdot E_{in} \exp^{i\phi_{ccw}} \quad (6)$$

The intensity $I_{out}$ of the output pulse from the output port 240 is shown by the following equation:

$$I_{out} = |E_{out}|^2 = |E_{L1} + E_{L2}|^2 \quad (7)$$
$$= |E_{in}|^2 [1 - 2\alpha(1-\alpha)(1 + \cos(\phi_{ccw} - \phi_{cw}))]$$
$$= I_{in}[1 - 2\alpha(1-\alpha)(1 + \cos(\phi_{ccw} - \phi_{cw}))]$$

Figure 5:
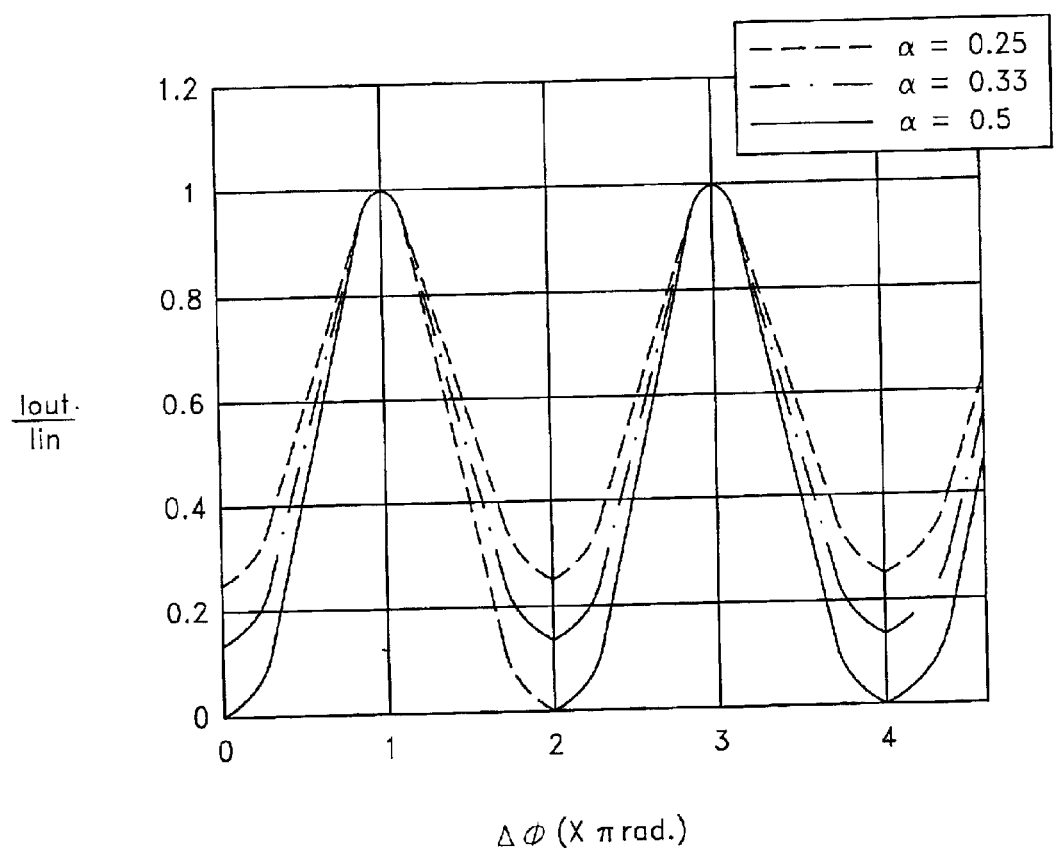
FIG. 5 is a graph on axes of phase shift (Δφ) and normalized output intensities from the output port of the coupler showing the relationship between relative phase of counter-propagating pulses in the fiber optic loop and the resultant output from the coupler.

FIG. 5 illustrates this relationship between the intensity output from the output port 240 and the phase difference ($\Delta\phi = \phi_{ccw} - \phi_{cw}$) between the two signals propagating CW and CCW around the loop 350. The output intensity is normalized by dividing out the input intensity. Plots are shown for several branching ratios ($\alpha$) for the optical coupler 200. One hundred percent (100%) transmission of the intensity of the optical pulse input into the pulse generator 100 is output through the output port 240 when the phase shift $\Delta\phi$ is $m\pi$ and m is an odd integer value.

The value of the nonlinear phase shifts $\Delta\phi$, i.e., the difference between $\phi_{ccw}$ and $\phi_{cw}$, depends on the intensity of the light pulse as it propagates through each of the segments 301, 302, 303, 304, 305, 306, 307, 308 of the fiber 300 as illustrated in equations (1) and (2). Accordingly, the specifications of the optical fiber pulse generator 100, such as the kind and the length ($L_i$) of optical fibers used as the fiber segments 301, 302, 303, 304, 305, 306, 307, 308 as well as the characteristics of the input signal, i.e., intensity ($I_i$), pulse width and pulse period supplied to the input port 220, can be appropriately selected to maximize the coupling into the output port 240 of the high intensity components. Similarly, parameters can be chosen such that the low intensity noise components are not coupled to the output port 240 but are sent back through the input port 220 instead. The main pulse component 10 of the optical pulse having a high intensity can therefore be directed through the output of the pulse generator 100. Meanwhile the noise component 12 existing in a foot portion of the optical pulse and having a low intensity is separated and returned to the input. The resultant output pulse obtained from the output port 240 is an optical pulse whose pulse width has been reduced and from which a noise component 12 has been removed.

A variety of parameters will affect the switching of the fiber optic loop. For example, the non-linearity and dispersion provided by the fiber segments 301, 302, 303, 304, 305, 306, 307, 308 are variables that affect the phase shift. The combination of optical fibers can be optimized by adjusting the lengths of the fibers in relation to the nonlinearities and dispersion characteristics of the optical fibers and the conditions of the input optical pulse. Other parameters, such as branching ratio $\alpha$ of the optical coupler 200 and the characteristics of the input pulses, intensity, shape, width, period may also influence the switching; however, the coupler and optical fiber 300 can be appropriately designed to provide for such switching of the peak portion and noise portion of the pulse.

As discussed above, a number of segments 301, 302, 303, 304, 305, 306, 307, 308 are concatenated together to provide for generation of short width pulses. In addition, the lengths of the fiber segments 301, 302, 303, 304, 305, 306, 307, 308 are progressively reduced (or increased) along the length of the fiber 300 in the fiber loop 350 to enhance the compression. The lengths of the fiber segments and the strengths of the nonlinear and dispersive effects therein are preferably appropriately selected for the particular intensity of the pulse to separate the central peak of the pulse from the noise as described above. The large number of different segments and the varying lengths complicates this process, and may be one of the reasons why no CDPF has previously been utilized in a loop mirror configuration. Calculations show that the fiber segments 301, 302, 303, 304, 305, 306, 307, 308 can be appropriately selected such that the CW and CCW propagating waves provide pulse compression and moreover that the noise component can be switched out of the output pulse.

Figure 6:
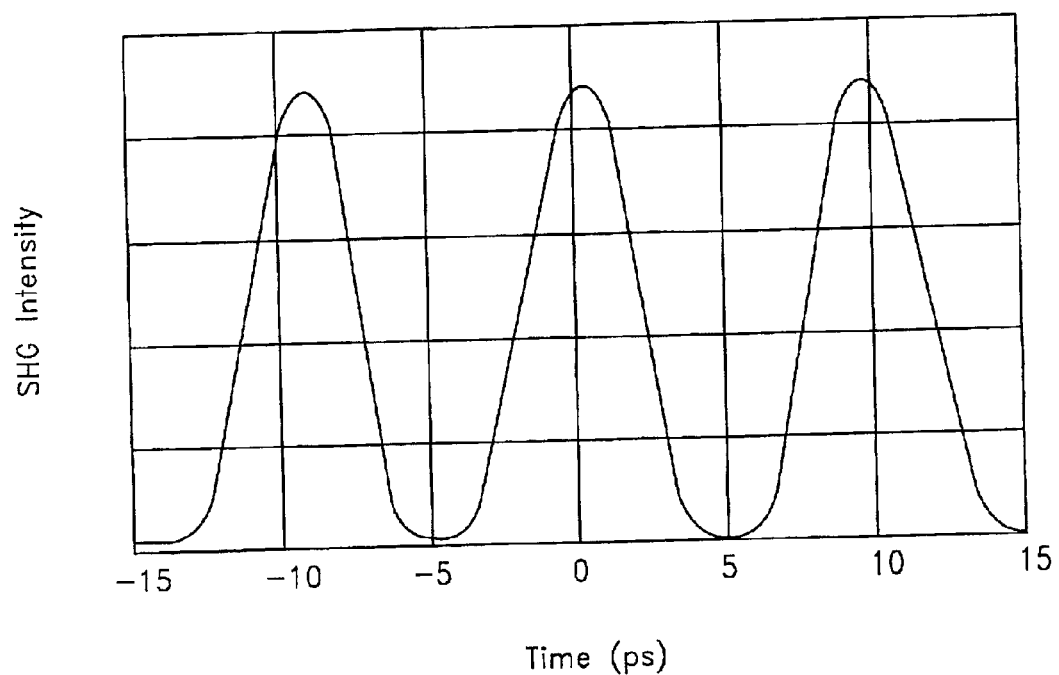
FIG. 6 is a graph on axes of time (in picoseconds) and intensity (in arbitrary units) corresponding to the autocorrelation of an optical pulse input to the optical pulse generator.
Figure 7:
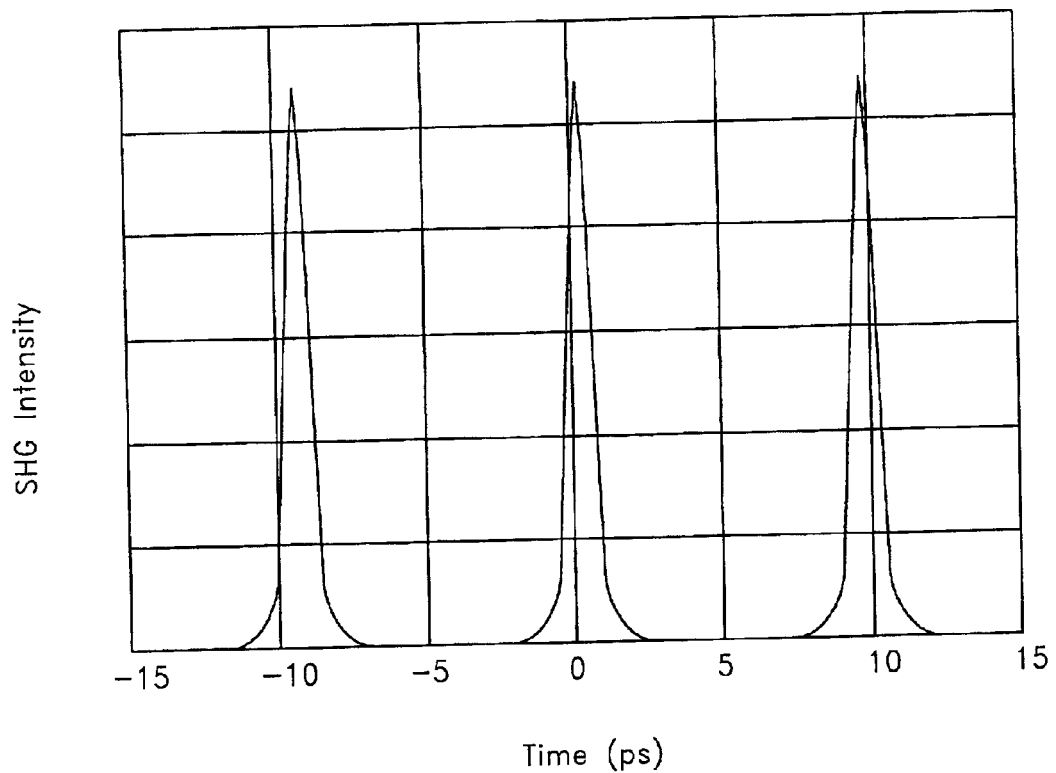
FIG. 7 is a graph on axes of time (in picoseconds) and intensity (in arbitrary units) corresponding to the autocorrelation of the output from the optical pulse generator resulting from the input depicted in FIG. 6.

FIGS. 6 and 7 show the autocorrelation of an exemplary set of optical pulse input into the input port 220 and output from the optical pulse generator 100, respectively. The pulses that enter the input port 220 of the coupler 200 have a FWHM pulse width of between about 4–6 picoseconds. These pulses are substantially reduced in width as shown in FIG. 7, which depicts the pulses output from the output port 240 of the coupler 200 as having a pulse width (FWHM) of less than 2 picoseconds. In addition, the noise pedestal has been reduced substantially.

Figure 8:
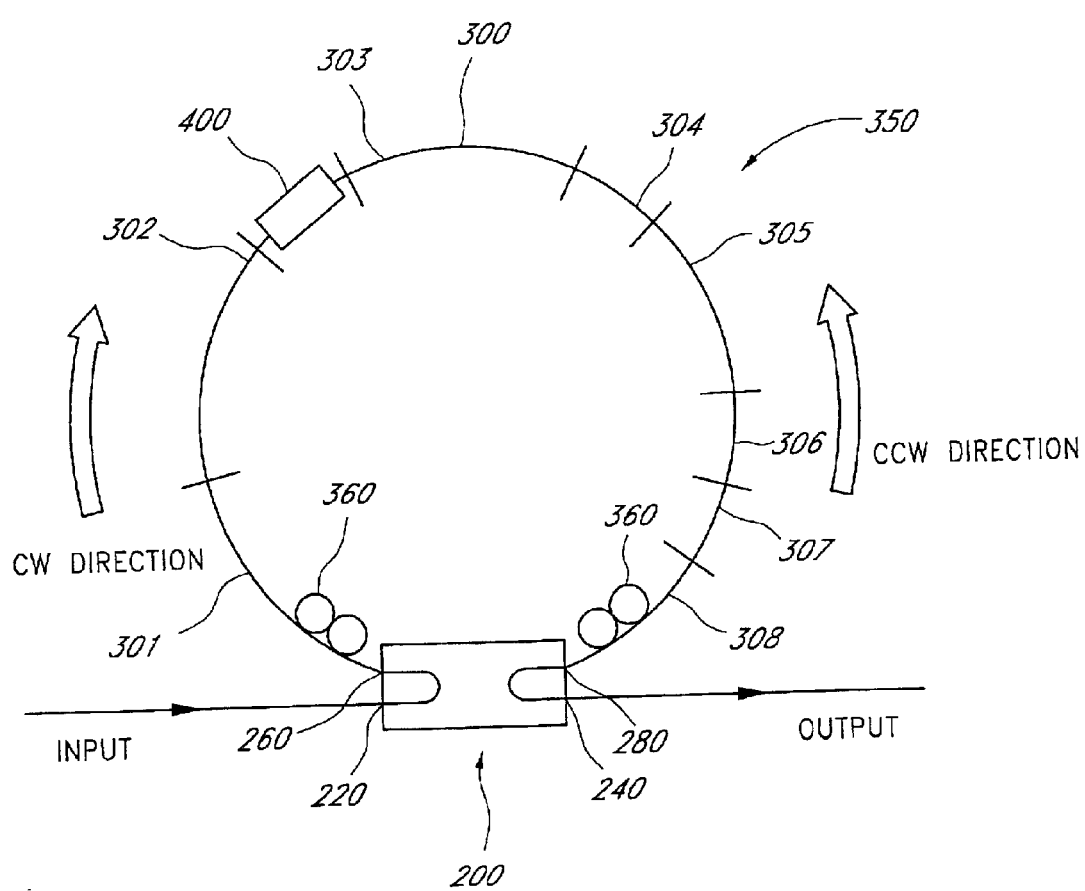
FIG. 8 is a schematic drawing of another embodiment of an optical pulse generator that includes an optical amplifier in the fiber optic loop.

In some embodiments, an optical amplifier 400 can be inserted in the fiber loop 350 as shown in FIG. 8. In this embodiment, the optical amplifier 400 is between the second and third fiber segments 302, 303. An Er-doped fiber amplifier (EDFA), for example, may be used as optical amplifier 400 to amplify, e.g., an optical pulse in the 1550 nm band. An optical fiber loop mirror containing a $Nd^{3+}$-doped fiber amplifier is described in M. E. Fermann et al, *Nonlinear amplifying loop mirror*, Optics Letters, Vol. 15, No. 13, Jul. 1, 1990, pp. 752–754, which is hereby incorporated herein by reference in its entirety.

The phase shifts caused in the pulses propagating in the CW and CCW directions through the optical fiber loop 350 with the optical amplifier 400 inserted therein are also characterized by equations (1) and (2). The intensity of light ($I_{cw}$) of the signal propagating in the CW direction, passing through the optical amplifier 400 and input to the third fiber segment 303 is amplified, as is the intensity of CCW propagating signal ($I_{cw}$), passing through the optical amplifier and input to the second fiber segment 302. For this case, the output electric field ($E_{out}$) from the output port 240 of the optical coupler 200 is also shown by equation (7) as described above.

Consequently, if the output electric field coupled into the output port 240 is to be maximized, the parameters of the device, such as the type and length of optical fibers segments and the branching ratio ($\alpha$) of optical coupler may preferably be suitably selected. Included in the type of optical fiber segment is the value of the nonlinear optical coefficient as well as amount of dispersion. In addition to considering the intensity of input pulse supplied to the input port, in this case, the place in which the optical amplifier 400 is disposed and the gain it provides, are likely factors that affect performance. Preferably, they are selected such that the pulse width of the output pulse is reduced and the pedestal noise is substantially removed.

In another embodiment, a highly nonlinear optical fiber having particular characteristics, e.g., those shown in the TABLE below, is employed as the nonlinear optical medium in the fiber optic loop 350. The $\gamma$ value of this highly nonlinear optical fiber is about five times larger than that of ordinary 1550 nm band zero-dispersion DSF which is about 2.5 $W^{-1}$ $km^{-1}$. If a highly nonlinear optical fiber is used (e.g. as fiber segments 301, 303, 305, and 307) to obtain the necessary nonlinear effect on the optical pulses, the fiber length can be reduced relative to that in the case where the ordinary optical fiber is used. If at least some of the fiber segments can be shortened by using such a highly nonlinear optical fiber, the overall length of the optical fiber loop 350 can be reduced. Consequently, the transmission loss can be reduced and the variation in the polarized state of the optical pulse propagating through the fiber loop 350 can be limited.

Other fiber having different nonlinear optical coefficients, for example, ranging between about 5 and 10 $W^{-1}$ $km^{-1}$ or more preferably between about 10 and 15 $W^{-1}$ $km^{-1}$ can be used. Preferably, the fiber segments 301, 302, 303, 304, 305, 306, 307, 308 have lengths less than about 1000 meters and more preferably between about 0.3 and 200 meters. Other fibers having different values of nonlinear optical coefficient and/or lengths are also possible.

TABLE

| Parameter | Value |
|---|---|
| Transmission loss | 0.61 dB/km |
| Zero-dispersion wavelength ($\lambda_0$) | 1565.5 mm |
| Dispersion slope | 0.029 ps/nm²/km |
| Nonlinear optical coefficient ($\gamma$) | 13.8 $W^{-1}km^{-1}$ |

The optic fiber loop 350, the optical coupler 200, and/or the optical amplifier 400 may comprise polarization-maintaining optical fiber. In the case where each of the optical fiber loop 350, the optical coupler 200, and the optical amplifier 400 comprise optical fiber that does not maintain polarization, the polarized state in the optical fiber varies. Moreover, the two pulse components propagating around the loop 350 in the CW and CCW directions possess different polarized states when combined in the optical coupler 200. Variation in the intensity of the output pulse obtained through the output port 240 can result. To avoid this problem, the polarized states of the two signals propagating around the optical fiber loop 350 can be made the same by providing the polarization controllers 360 in the optical fiber loop 350.

If, however, each of the fiber segments 301, 302, 303, 304, 305, 306, 307, 308, the optical coupler 200, and the optical amplifier 400, comprise polarization-maintaining optical fiber, a polarization controller 360 need not be provided in the optical fiber loop 350. The polarization state of the pulse input through the input port 240 is maintained during transmission through the optical pulse generator 100. Effective mode coupling of pulse components in the optical coupler 200 can be achieved without any polarization controller 360.

Figure 9:
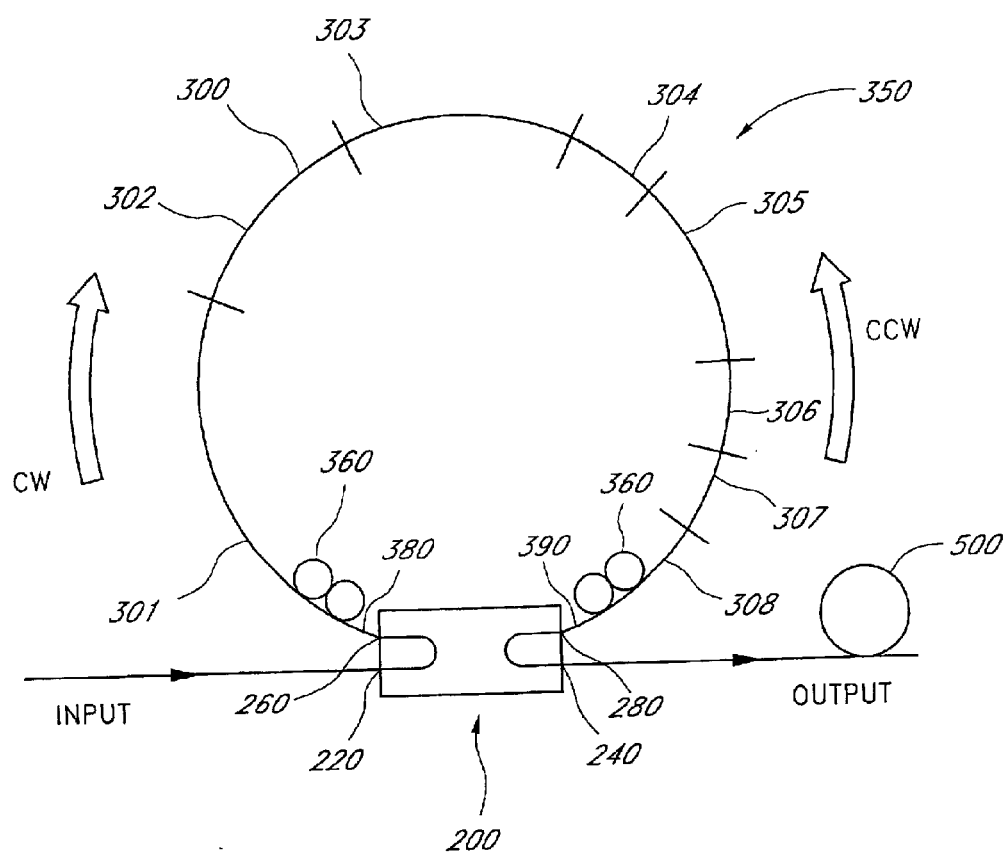
FIG. 9 is a schematic drawing of another embodiment of an optical pulse generator that includes a chirp compensation fiber.

A chirp compensation fiber 500 may also be included, for example, by being optically connected to the output port 280 of the optical coupler 200 as illustrated in FIG. 9. In some cases, an optical pulse output through the output port 280 is accompanied by a chirp. The chirp compensation fiber could compensate for chirp on the pulse output from the coupler and thereby further reduce pulse width.

Figure 10:
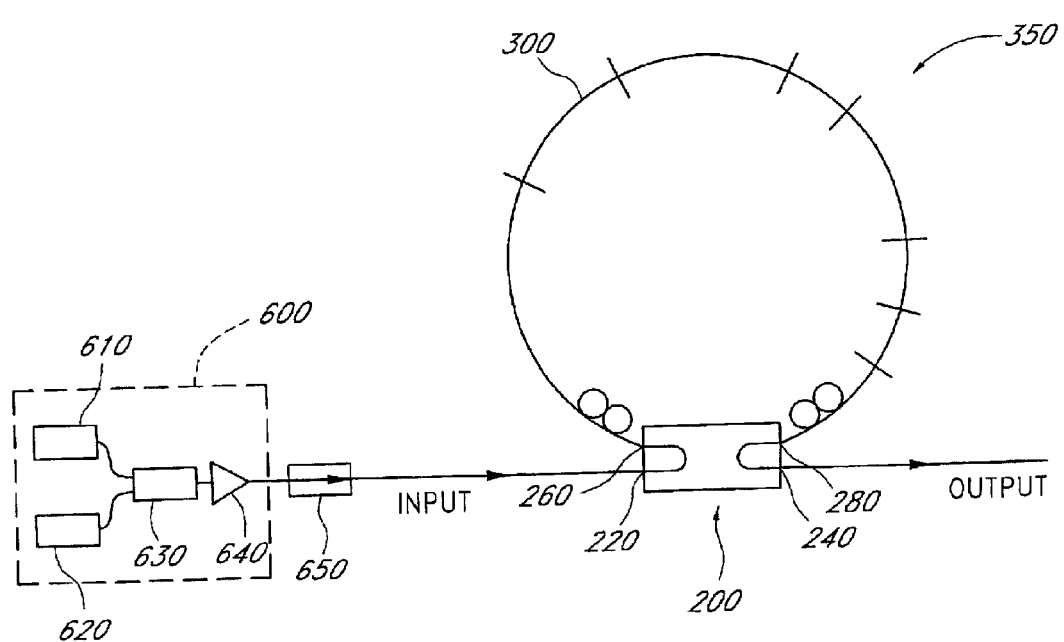
FIG. 10 is schematic drawing of another embodiment of an optical pulse generator that includes an intensity modulated optical source optically connected to provide input to the optical coupler.

An optical pulse source for use in optical communication can be fabricated with the pulse generator/shaper of FIG. 3. An intensity modulated light source 600 can be optically coupled to the input port 220 as shown in FIG. 10. This light source 600 may comprise two wavelength variable light sources 610, 620, an optical coupler 630, and an optical amplifier 640. Two optical pulses output respectively from the wavelength variable light sources 610, 620 are combined by the optical coupler 630 to form a beat signal. This beat signal is intensity-amplified by the optical amplifier 640 and is directed into the input port 220 of the optical coupler 200 for transmission through the fiber loop 350. An optical isolator 650 may be inserted between the intensity modulated light source 600 and the input port 220 to prevent light returned from the optical fiber loop 350 from reaching the light source 600.

Figure 11:
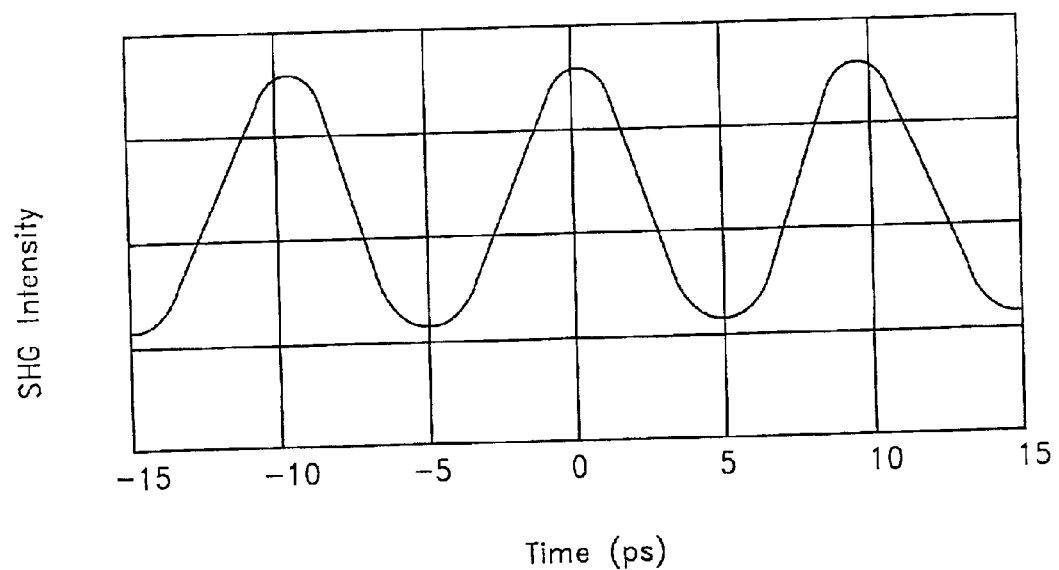
FIG. 11 is a graph on axes of time (in picoseconds) and intensity (in arbitrary units) corresponding to the autocorrelation of the waveform generated by beating two separate light sources included in the modulated light source of FIG. 10.
Figure 12:
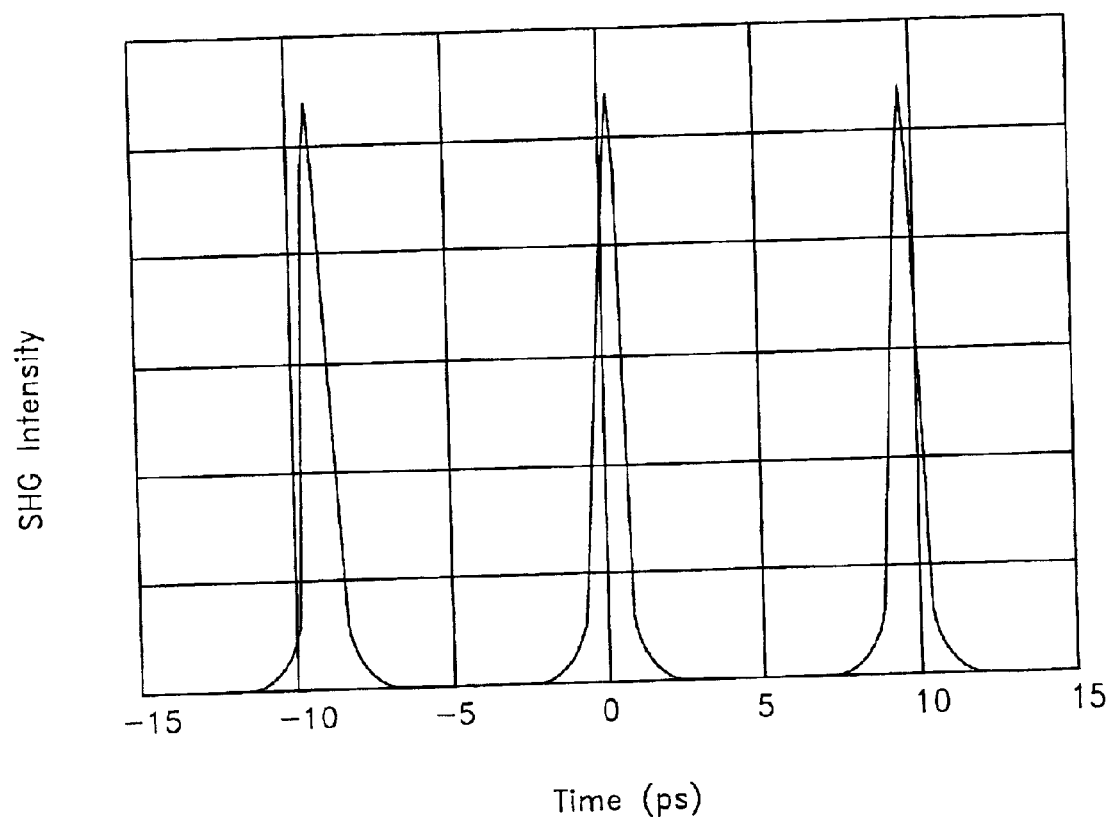
FIG. 12 is a graph on axes of time (in picoseconds) and intensity (in arbitrary units) corresponding to the autocorrelation of the output from the optical pulse generator having as input the waveform whose autocorrelation is depicted in FIG. 11.

FIG. 11 shows the autocorrelation of an exemplary beat signal generated by the above-described intensity modulated light source 600. The beat signal is obtained by activating the two light sources 610, 620 which provide two beams each having a wavelength near 1565 nm but offset from each other by about 0.8 nm. These two beams combine in the optical coupler 630 to produce a beat signal with a pulse period of about 100 GHz. FIG. 12 shows an autocorrelation trace of the optical pulse output from the output port 240 of the optical pulse generator 100 when the above-described beat light is supplied as an input pulse. An optical pulse having a reduced pulse width is obtained from the optical pulse generator 100. The noise component at the base of the pulse is also substantially absent.

Figure 13:
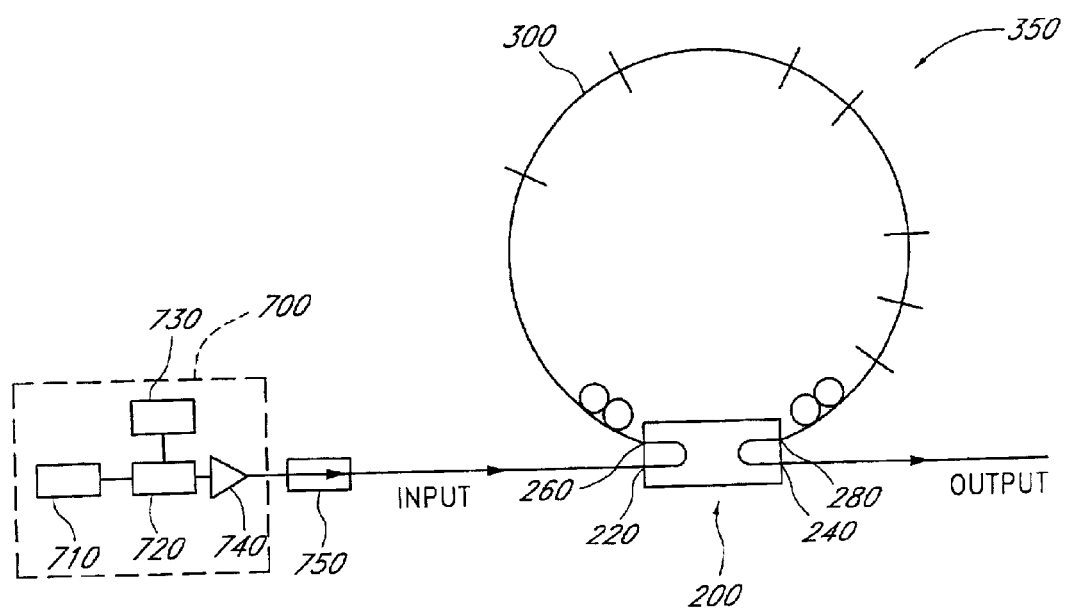
FIG. 13 is a schematic drawing of an embodiment of an optical pulse generator that includes another type of modulated optical source optically coupled to one of the ports of the optical coupler.

As shown in FIG. 13, a different intensity modulated light source 700 comprising a variable wavelength light source 710, an intensity modulator 720 optically connected to the variable wavelength light source, an electrical signal generator 730 electrically connected to the intensity modulator. An optical amplifier 740 is optically connected to the intensity modulator 720 and an optical isolator 750 is inserted between the intensity modulated light source 700 and the input port 220 of the optical pulse generator. An optical pulse of a predetermined wavelength is output from the wavelength variable light source 710 and is modulated by the intensity modulator 720, which is controlled by electrical signal generator 730. The output of the optical modulator 720 is amplified by the optical amplifier 740 before being supplied to the input port 220.

Figure 14:
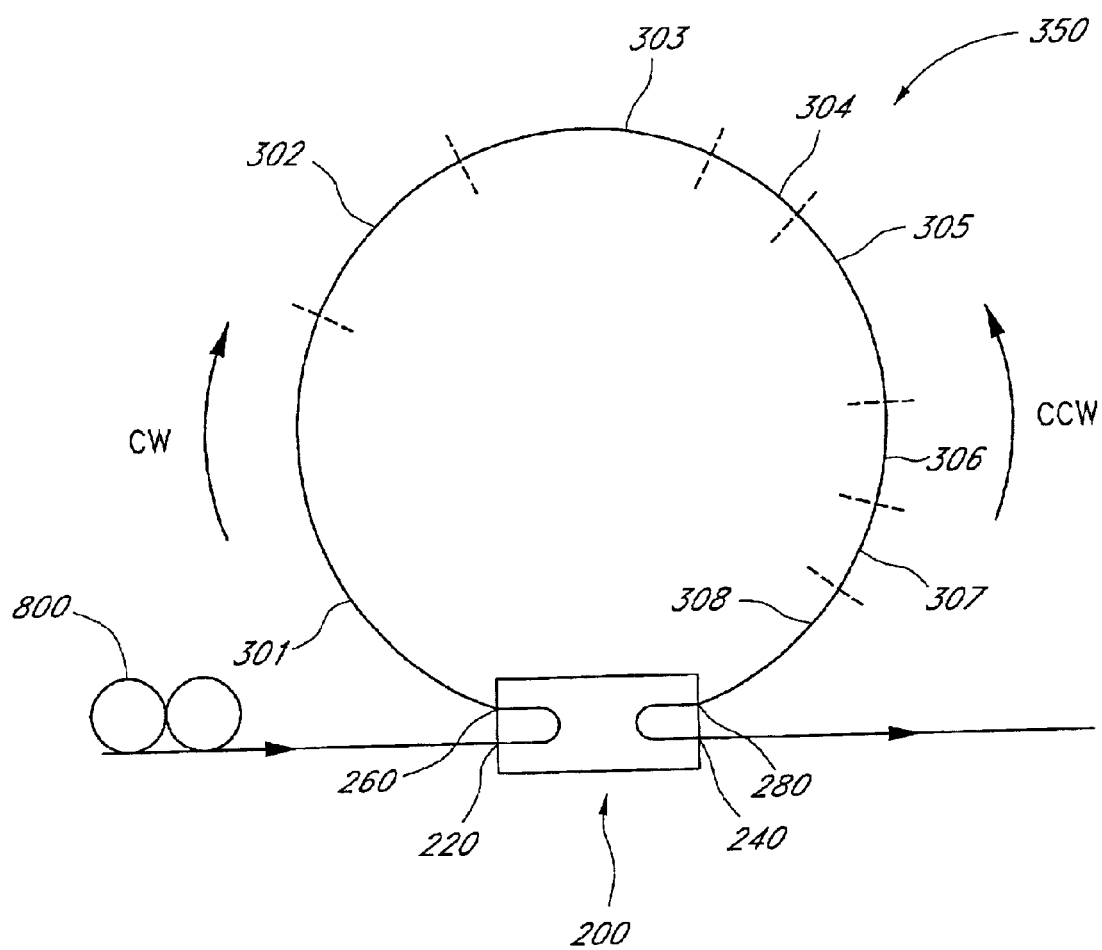
FIG. 14 is a schematic drawings of an embodiment of an optical pulse generator that includes a polarization controller to fix the polarization state of light input into the fiber coupler.

A polarization controller 800 can be inserted between the source of light and the optical coupler 200 as shown in FIG. 14. As described above, the polarization controller 800 regulates the state of polarization of pulses entering the optical coupler 200 to provide an optimum state of polarization. Preferably, the optical coupler 200 and the fiber optic line 300 are substantially polarization-maintaining. In this case, polarization controllers 360 need not be included in the fiber loop 350.

Figure 15:
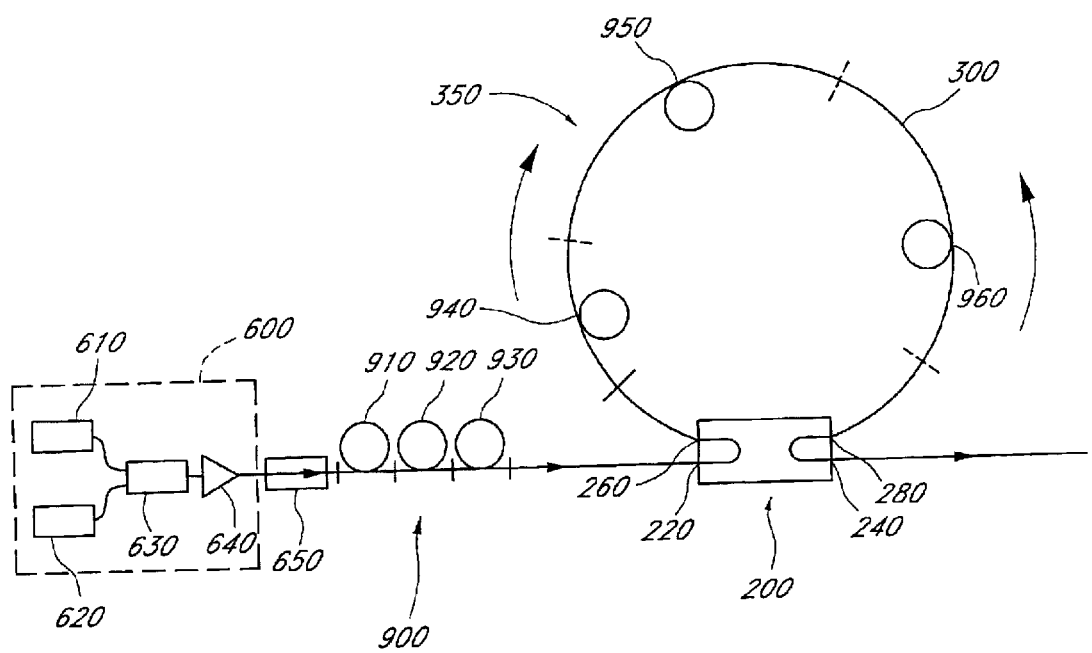
FIGS. 15 and 16 are schematic drawings of embodiments of an optical pulse generator similar to those depicted in FIG. 10 further comprising additional alternating segments of fiber exhibiting higher optical non-linearities and segments exhibiting higher dispersion for providing pulse compression prior to input into the fiber optic coupler and the fiber optic loop.

Other designs for providing a fixed polarization state can be realized as illustrated in FIG. 15 where the light sources 610, 620 within the intensity modulated light source 600 comprise wavelength variable light sources having a characteristic for producing a constant polarization output, i.e., the polarization state remains substantially fixed over time. In one example, a distributed fiber Bragg laser diode (DFB-LD) can be used as the wavelength variable light source. Two beams of light output from each of the laser diodes 610 and 620 are combined by the optical coupler 630 preferably in a manner that the polarization of the two beams are identical. The two signals are beat together to produces a modulated signal comprising a plurality of short pulses. Preferably, the optical components, e.g., the fiber optic loop 350 and the fiber optic coupler 200, through which the pulses propagate are polarization maintaining such that the state of polarization of pulses is preserved. In such cases, a polarization controller is not needed.

Additionally, the embodiment depicted in FIG. 15 includes a section of optical fiber 900 designed to provide pulse compression that is inserted between the light source 600 and the optical coupler 200. This section 900 may comprise an optical fiber having a comb-like dispersion profile. In particular, this section 900 may comprise a plurality of segments wherein adjacent segments differ in dispersive and nonlinear characteristics. In one embodiment, for example, a first segment 910 may comprise a 1.55 μm band zero-dispersion fiber (DSF) providing optical nonlinearity, followed by a second segment 920 comprising 1.3

μm band zero-dispersion fiber (SMF), which is dispersive, followed by a third segment 930 comprising 1.55 μm band zero-dispersion fiber (DSF) that is optically non-linear. This comb-like dispersion profile fiber section 900 is designed to produce a pulse compression prior to entry into the fiber loop 350.

Figure 16:
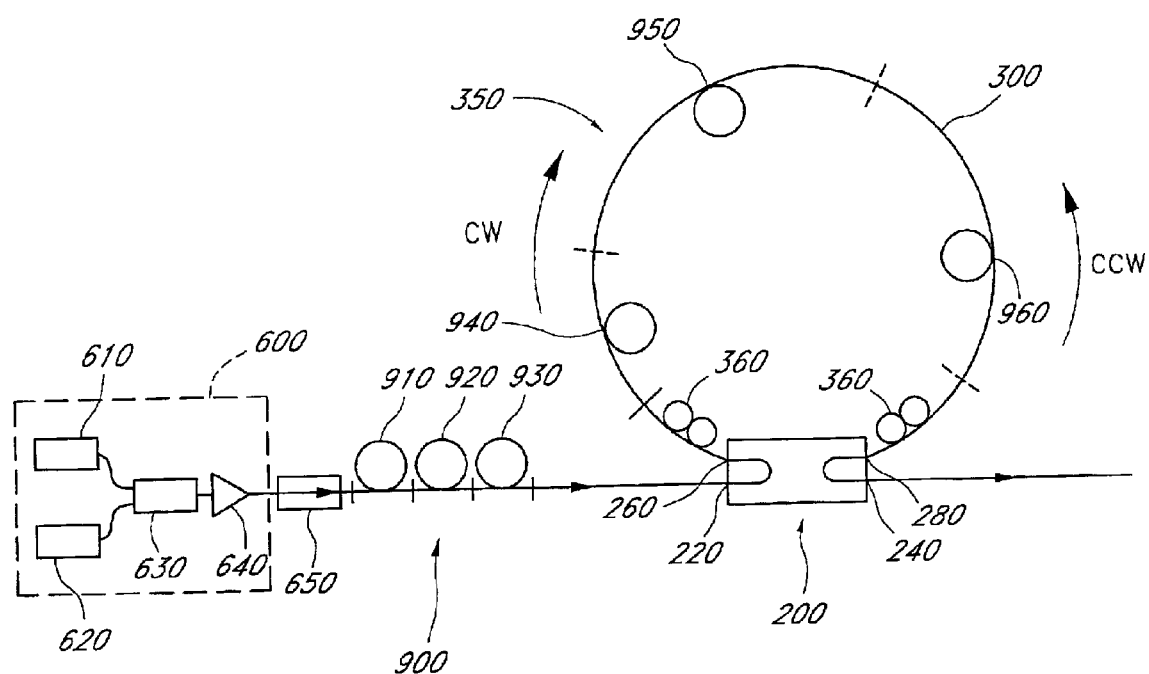

The optical fiber loop 350 comprises three fiber segments 940, 950, 960, the first and third 940, 960 comprising dispersive single mode fiber (SMF), and the second segment 950 comprising zero-dispersion shifted fiber (DSF) that is optically nonlinear. Light output by the two wavelength variable light sources 610, 620 are combined by the optical coupler 630 and produce beat signal containing a plurality of pulses. These optical pulses, amplified by the optical amplifier 640, travel through the optical isolator 650 onto the CDPF section 900 before entering the fiber loop 350. The beat signal propagates through the first segment 910 having nonlinear optical properties, the second dispersive segment 920, and the third segment 930 which has nonlinear optical nonlinear characteristics substantially the same as the first segment 910. The pulses are compressed by the combination of the first nonlinear optical segment 910 and the second dispersive segment 920. These pulses are also exposed to the nonlinear effect of the third segment 930 in the CDPF, which preferably provides a degree of chirping. After exiting this section 900 of fiber, the optical pulses are input into the optical coupler 200 and the fiber optic loop 350. Additional pulse compression is provided by the fiber loop 350. The chirped pulse that exits the third segment 930 of the CDPF preceding the fiber optic loop 350 is transmitted through the first dispersive segment 940 of the fiber optic line and undergoes compression therein. The optical pulse undergoes additional pulse compression in the remaining nonlinear and dispersive segments 950, 960 of the fiber optic loop. Thus, the comb-like dispersion profile of the section of fiber 900 preceding the fiber loop combined with the comb-like dispersion profile of the fiber loop 300 itself provide pulse compression. One or more polarization controllers 360 may be introduced into the fiber optic loop 350 as illustrated in FIG. 16 to fix the polarization states of the clockwise and counter-clockwise propagating waves. Accordingly, non-polarization-maintaining fiber and components may be employed.

Figure 17:
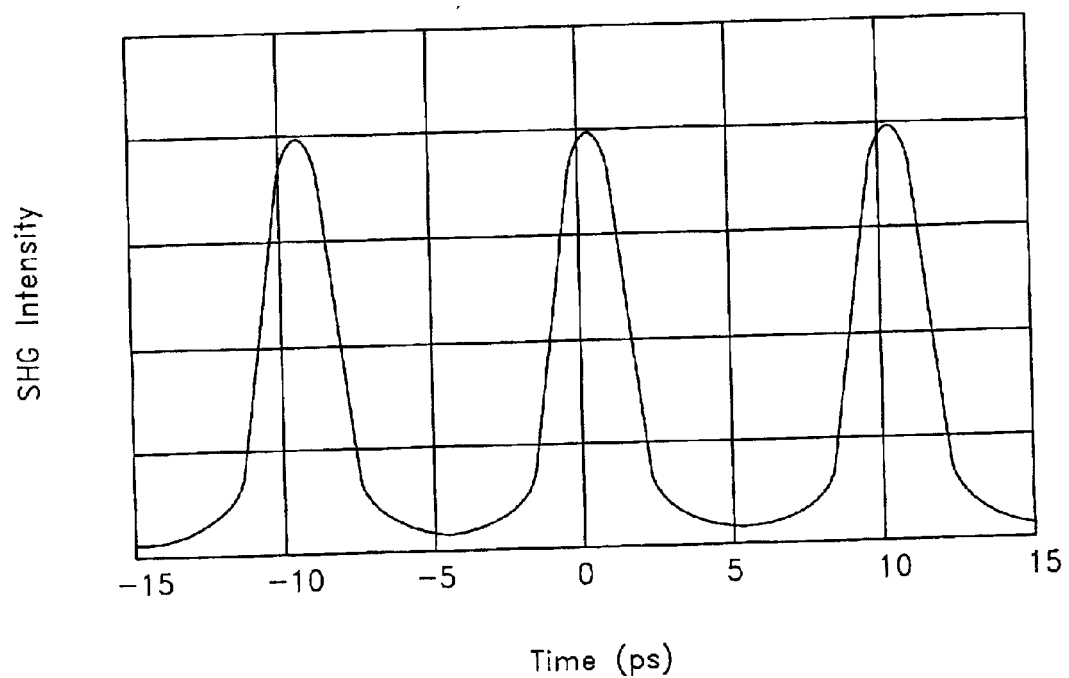
FIG. 17 is a graph on axes of time (in picoseconds) and intensity (in arbitrary units) corresponding to the autocorrelation of a waveform input into the opitcal coupler of FIGS. 15 and 16.
Figure 18:
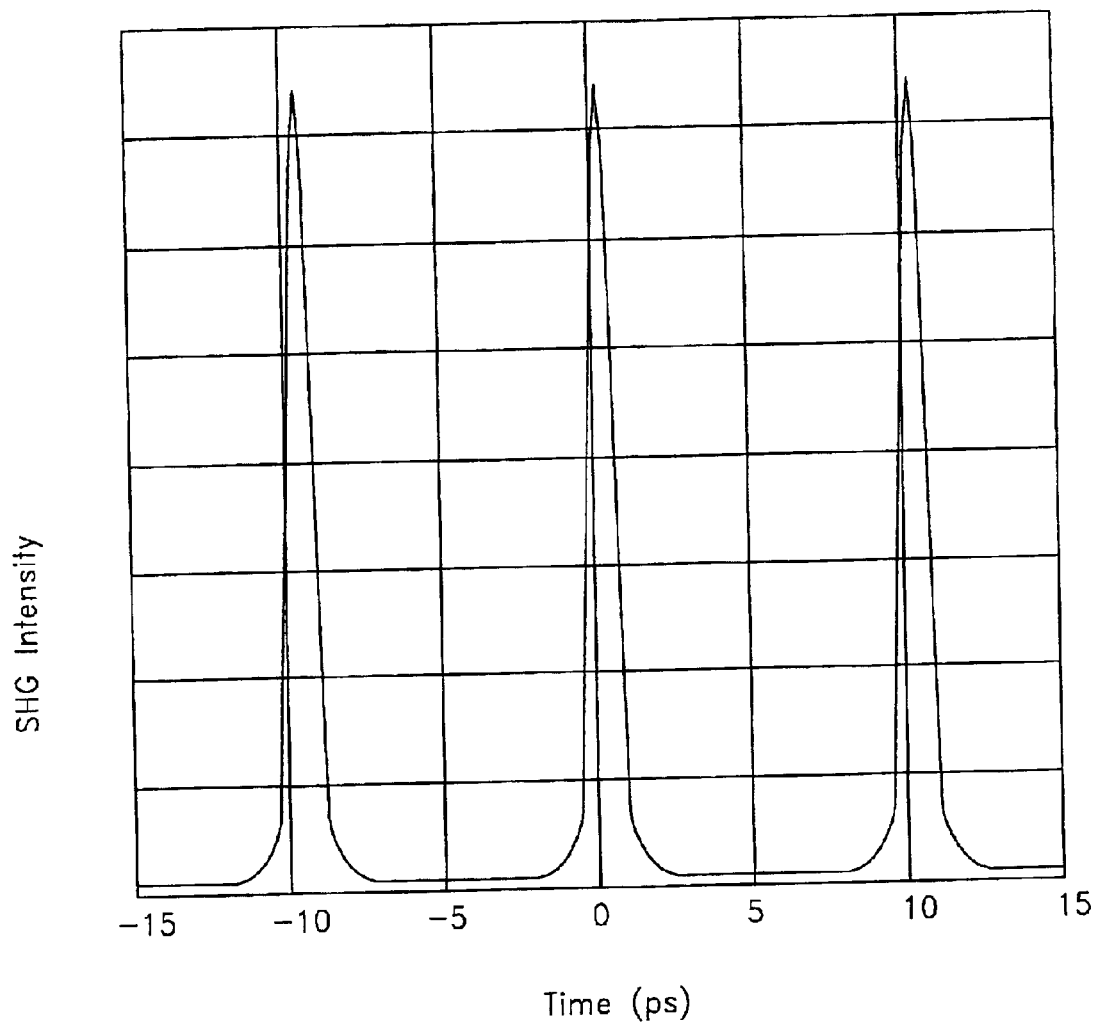
FIG. 18 is a graph on axes of time (in picoseconds) and intensity (in arbitrary units) corresponding to the autocorrelation of the output from the optical pulse generator (i.e., from the optical coupler) having as input the waveform whose autocorrelation is depicted in FIG. 17.

Initial compression is introduced by the comb-like dispersion profile section 900 comprising the three fiber segments 910, 920, 930 which precede the fiber optic loop as shown in FIG. 17. These exemplary pulses input into the input port 240 of the coupler 200, have a FWHM pulse width of between about 1 to 3 picoseconds. These pulses are substantially reduced in width as shown in FIG. 18, which depicts the pulses output from the output port 240 of the coupler 200. The pulse width (FWHM) at the output 240 is less than about 1 picosecond. For example, a pulse having a pulse width of about 1.369 picoseconds at the input 220 of the coupler 200 is compressed to a pulse of about 380 femtosecond (fs) at the output 240, i.e., a reduction of about 1/3.6.

Figure 19:
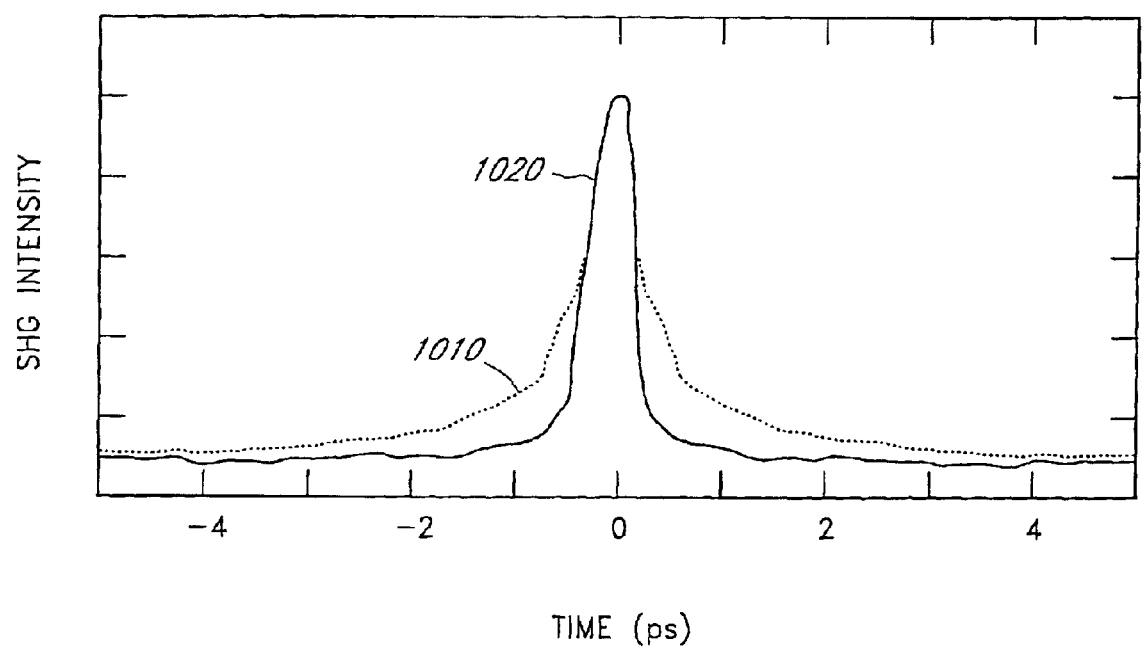
FIG. 19 depicts graphs on axes of time (in picoseconds) and intensity (in arbitrary units) corresponding to the autocorrelation of a pulse after propagating clockwise (cw) around the fiber optic loop and the autocorrelation of the optical pulse produced by interfering clockwise (cw) and counter-clockwise (ccw) propagating pulses within the optical coupler showing the noise reduction provided by the device.

Interference between the clockwise and counter-clockwise propagating waves in the optical mirror preferably results in substantial reduction of the pedestal noise as depicted in FIG. 19, which shows the difference between the waveform output from the fiber segment 960 adjacent to the second fiber loop port 280 and the waveform output from the output port 240. After propagating around the fiber loop 350 through the three segments 940, 950, and 960 in the clockwise direction, the pulses in one example, has more than about twice as much noise at its base than the pulses propagating from the output 240 of the coupler 200. The comparison provided by FIG. 19 demonstrates how pedestal noise is substantially reduced. Accordingly, using a comb-like dispersion profile fiber to form the fiber loop 350 of a fiber mirror enables the pulse width to be substantially compressed while noise is substantially reduced.

Although three fiber segments 910, 920, 930 are included in the CDPF 900 preceding the optical mirror depicted in FIGS. 15 and 16, more segments may be employed. Moreover, the arrangement of the separate segments is not to be limited to that described above, i.e., a nonlinear optical fiber segment, followed by a dispersive optical fiber, followed by another nonlinear optical fiber segment. For example, in the case where the first fiber segment 910 comprises nonlinear optical fiber (e.g., DSF), the second and third segments, 920, 930 may include respectively another nonlinear optical fiber (DSF) and a dispersive segment SMF or alternatively a dispersive fiber (SMF) and a nonlinear optical fiber (DSF). Also, if the first fiber segment 910 is a nonlinear optical fiber (e.g. DSF), other possibilities include the following combinations of additional fiber segments:

1) nonlinear (DSF), dispersive (SMF), nonlinear (DSF), dispersive (SMF), and nonlinear (DSF)
2) nonlinear (DSF), dispersive (SMF), nonlinear (DSF), and dispersive (SMF)
3) dispersive (SMF), nonlinear (DSF), dispersive (SMF), and nonlinear (DSF)
4) dispersive (SMF), nonlinear (DSF), dispersive (SMF)

Any other number of segments may also be included and the lengths of these segments may vary. These lengths, for example, may increase or decrease.

As described above, the optical pulse generator is capable of simultaneously achieving both pulse width compression and removal of low intensity noise and is therefore useful as a pulse signal light source for application in a high-speed high-bit-rate communication systems. These communication systems may include a transmitter, an optical fiber transmission line, and an optical detector/receiver. The optical pulse generator 100 may find application in the transmitter or in other components of the optical communication system. In addition to providing improved quality, short duration optical pulse, the pulse generator can be constructed by combining inexpensive, readily available optical components. For example, as discussed above the fiber line in the fiber loop 350 may comprise 1550 nm zero-dispersion shifted optical fiber and 1300 nm zero dispersion optical fiber instead of a specially fabricated fiber having a customized dispersion.

The present invention may be embodied in other specific forms without departing from the essential characteristics as described herein. The embodiments described above are to be considered in all respects as illustrative only and not restrictive in any manner. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of any invention is, therefore, indicated by the following claims rather than the foregoing description. Any and all changes which come within the meaning and range of equivalency of the claims are to be considered in their scope.

What is claimed is:

1. A device for producing optical pulses comprising:
   an optical mirror comprising an input port, an output port, and a fiber optic loop having two ends, said input port optically connected to both ends of said fiber optic loop such that an optical pulse input into said input port is split into two lesser magnitude optical pulses which are counter-propagating pulses that propagate in opposite directions through said fiber optic loop, said output port also optically connected to each of said ends of said fiber optic loop so as to receive optical energy from both of said counter-propagating pulses, wherein said fiber optic loop comprises a comb-like dispersion profiled fiber having three or more sections characterized by changes in dispersion and arranged to compress said pulses propagating therethrough, said sections having lengths such that said counter-propagating pulses are phase-shifted with respect to each other so as to optically interfere with each other to prevent noise associated with said optical pulses from being output from said output port.

2. The optical device of claim 1, wherein sections of said comb-like dispersion profile fiber increase in length from one end of said fiber loop to said other end of said fiber loop.

3. The optical device of claim 2, wherein said sections have a length between about 0.3 and about 200 meters.

4. The optical device of claim 1, wherein said comb-like dispersion profile fiber comprises four or more sections delimited by changes in dispersion.

5. The optical device of claim 1, wherein said comb-like dispersion profile fiber comprises six or more sections delimited by changes in dispersion.

6. The optical device of claim 1, wherein said comb-like dispersion profile fiber comprises eight or more sections delimited by changes in dispersion.

7. The optical device of claim 1, wherein said lengths and dispersive and nonlinear characteristics are selected such that an optical pulse propagating through said fiber optic loop is repeatedly compressed.

8. The optical device of claim 1, further comprising an optical amplifier in said fiber optic loop.

9. The optical device of claim 1, further comprising a chirp compensation fiber.

10. The optical device of claim 1, further comprising at least one polarization controller within said fiber optic loop.

11. The optical device of claim 1, wherein said comb-like dispersion profile fiber comprises polarization maintaining fiber.

12. The optical device of claim 1, further comprising polarization controller optically coupled to said input of said optical mirror to regulate the polarization state of optical pulses input into said optical mirror.

13. The optical device of claim 1, further comprising comb-like dispersion profile fiber optically coupled to said input of said optical mirror such that optical pulses are compressed prior to input into said optical mirror.

14. A device for producing optical pulses comprising:
a four-way optical coupler having four ports, an input port, two side ports and an output port, said coupler defining an optical path from said input port to said two side ports and from each of said two side ports to said output port such that light received by said optical coupler through said input port is coupled to each of said side ports and light entering either of said side ports may be directed through both said input port and said output port;
an optical path optically connecting said side ports such that light entering said input port and coupled to one of said side ports propagates through said optical path back into said other side port, said optic path comprising separate portions having different lengths and alternating in dispersive and nonlinear characteristics, wherein said lengths, and dispersive and nonlinear characteristics are selected in accordance with characteristics of an input pulse such that input optical pulses propagating through said optical path are compressed in width and are phase shifted with respect to each other an amount to cause said pulses to interfere when combined in said optical coupler to separate out lower intensity noise components from peak signal components associated with said pulses.

15. The optical device of claim 14, wherein said optical path comprises alternating sections imparting stronger nonlinear effects and sections that introduce more dispersion.

16. The optical device of claim 14, wherein said optical path comprises four or more sections.

17. The optical device of claim 15, wherein said lengths and dispersive and nonlinear characteristics are selected such that an optical pulse propagating through said optical path is repeatedly compressed.

18. The optical device of claim 17, wherein said lengths and dispersive and nonlinear characteristics are selected such that an optical pulse propagating through said optical path is repeatedly chirped producing frequency components that are swept in time.

19. The optical device of claim 18, wherein said lengths and dispersive and nonlinear characteristics are selected such that spectral components within said chirped optical pulse are delayed so as to compress said pulse width.

20. The optical device of claim 14, further comprising an optical amplifier in said optical path.

21. The optical device of claim 14, further comprising a chirp compensation fiber optically connected to said output port of said optical fiber coupler.

22. An optical pulse generator for an optical communication system, said optical device comprising:
a pulsed laser light source;
a coupler having an input port configured to receive light from the pulsed laser light source and to distribute said light received into said input port into first and second intermediate ports, said light distributed into said first and second port propagating in a first direction, said coupler also including an output port configured to receive light from either of said first and second intermediate ports propagating in a second direction opposite said first direction; and
a separate optical path from said first intermediate port to said second intermediate port for light pulses propagating in said first direction clockwise from said first port to said second port and counter-clockwise from said second port to said first port, said optical path including a plurality of pairs of dispersive and non-linear optical sections, each pair configured to compress said optical pulses propagating therethrough, said plurality of pairs dispersive and non-linear optical sections having different lengths arranged to provide asymmetry such that said pulses traveling in said clockwise direction and said pulses traveling in said counter-clockwise direction experience different amounts of phase shift with respect to each other,
wherein said phase shift causes interference between said clockwise and counter-clockwise pulses combined within said coupler, said interference resulting in separation of low intensity noise from said compressed pulses output through said output port of said coupler.

23. The optical pulse generator of claim 22, wherein said light source comprises a modulator for producing pulsed waveforms.

24. The optical pulse generator of claim 22, wherein said light source comprises a plurality of optical sources having different wavelengths that are combined to produce a modulated light beam.

25. The optical pulse generator of claim 22, further comprising an optical amplifier for amplifying the light output by said light source, said amplifier positioned to amplify said light prior to coupling into said optical coupler.

26. The optical pulse generator of claim 22, further comprising an optical isolator positioned between said light source and said optical coupler.

27. The optical pulse generator of claim 22, further comprising polarization controllers positioned between said light source and said optical coupler, said polarization controllers configured to set the polarization of said light input into said optical coupler.

28. The optical pulse generator of claim 22, further comprising a plurality of dispersive and non-linear optical sections positioned between said light source and said optical coupler, said plurality of dispersive and non-linear optical sections configured to compress optical pulses propagating therethrough.

29. A method of compressing an optical pulse to provide a reduced pulse width and to remove noise, said method comprising:
    splitting said optical pulse into first and second portions of lesser magnitude;
    propagating said first portion in a first direction through a medium comprising at least four sections creating a comb-like dispersion profile, said sections alternating in dispersion level, said first portion undergoing pulse compression and phase shift with said propagation through said medium;
    propagating said second portion in a second direction opposite to said first direction through said medium comprising at least four sections creating a comb-like dispersion profile, said second portion also undergoing pulse compression and phase shift with said propagation through said medium; and
    combining and optically interfering said phase shifted pulse portions so as to at least partially eliminate said noise.

30. The method of claim 29, wherein said four sections decrease in length in said first direction.

31. The method of claim 29, wherein said medium comprises an optical waveguide.

32. The method of claim 29, wherein said medium comprises an optical fiber.

33. A method of compressing an optical pulse to provide a reduced pulse width and to remove noise, said method comprising:
    splitting said optical pulse into first and second optical pulses;
    chirping said first optical pulse;
    delaying selected frequency components of said chirped optical pulse to reduce the pulse width of said optical pulse;
    further chirping and delaying said first optical pulse but to a different extent than before to further reduce the pulse width of said first optical pulse;
    chirping and delaying said second optical pulse;
    introducing different amounts of phase shift to said first and second pulses; and
    combining said first and second optical pulses in a coupler to separate out high intensity components associated with a peak and low intensity components associated with said noise.

34. The method of claim 33, further comprising further chirping and delaying said second optical pulse but to a different extent than before to further reduce the pulse width of said second optical pulse.

35. An apparatus for compressing an optical pulse to provide a reduced pulse width and to remove noise, said apparatus comprising:
    a first means of chirping a first optical pulse;
    a first means of delaying selected frequency components of said chirped optical pulse to reduce the pulse width of said first optical pulse;
    a second means of chirping said first optical pulse;
    a second means of delaying said first optical pulse but to a different extent than before to further reduce the pulse width of said first optical pulse;
    a first means of chirping a second optical pulse;
    a second first means of delaying said second optical pulse to reduce the pulse width of said second optical pulse;
    a means of introducing different amounts of phase shift to said first and second pulses; and
    a means for interfering said first and second optical pulses to separate out high intensity components associated with a peak and low intensity components associated with said noise.

* * * * *